(12) United States Patent
Teshima et al.

(10) Patent No.: US 8,449,191 B2
(45) Date of Patent: May 28, 2013

(54) BEARING STRUCTURE, MOTOR, AND FAN APPARATUS

(75) Inventors: Hiroyoshi Teshima, Kyoto (JP); Koji Muraoka, Kyoto (JP); Kiyoto Ida, Kyoto (JP)

(73) Assignee: Nidec Corporation, Kyoto (JP)

( * ) Notice: Subject to any disclaimer, the term of this patent is extended or adjusted under 35 U.S.C. 154(b) by 931 days.

(21) Appl. No.: 12/542,065

(22) Filed: Aug. 17, 2009

(65) Prior Publication Data

US 2010/0054965 A1 Mar. 4, 2010

(30) Foreign Application Priority Data

Aug. 29, 2008 (JP) ................................ 2008-222466
Jul. 9, 2009 (JP) ................................ 2009-162471

(51) Int. Cl.
*F16C 33/02* (2006.01)
*F04B 35/04* (2006.01)
*H02K 5/16* (2006.01)

(52) U.S. Cl.
USPC .............................. 384/295; 310/90; 417/354

(58) Field of Classification Search
USPC ......... 310/90, 67 R, 60 R, 62, 63; 360/98.07, 360/99.08, 99.09, 99.04; 384/275, 276, 279, 384/291, 295, 296, 441; 417/354, 423.12
See application file for complete search history.

(56) References Cited

U.S. PATENT DOCUMENTS

| | | | |
|---|---|---|---|
| 5,343,104 A | | 8/1994 | Takahashi et al. |
| 5,610,462 A | * | 3/1997 | Takahashi ........................ 310/90 |
| 5,628,569 A | | 5/1997 | Hayakawa et al. |
| 2005/0116557 A1 | * | 6/2005 | Rojo Lulic ................... 310/67 R |
| 2005/0200216 A1 | * | 9/2005 | Brown ............................ 310/90 |
| 2009/0309438 A1 | * | 12/2009 | Horng et al. ..................... 310/90 |

FOREIGN PATENT DOCUMENTS

| | | | |
|---|---|---|---|
| JP | 58077913 A | * | 5/1983 |
| JP | 7-243449 A | | 9/1995 |
| JP | 2886049 B2 | | 4/1999 |
| JP | 2948735 B2 | | 9/1999 |
| JP | 2994150 B2 | | 12/1999 |
| JP | 2000-175399 A | | 6/2000 |
| JP | 2001-248644 A | | 9/2001 |
| JP | 2004-263710 A | | 9/2004 |
| JP | 3698504 B2 | | 9/2005 |
| JP | 2007-236146 A | | 9/2007 |

* cited by examiner

*Primary Examiner* — Richard Ridley
*Assistant Examiner* — Alan Waits
(74) *Attorney, Agent, or Firm* — Keating & Bennett, LLP

(57) ABSTRACT

A sleeve support portion is arranged to support a sleeve having a rotating shaft inserted therein such that the rotating shaft is rotatable. A plurality of ribs extending in an axial direction is provided on an inner surface of the sleeve support portion. The ribs are preferably spaced from each other in a circumferential direction centered on the rotating shaft, and arranged to make contact with at least a portion of the sleeve. The ribs include a plurality of types of ribs, each type of the ribs having a different axial position of an axial edge, on an axially opening portion side, of a contact surface thereof which is arranged to make contact with the sleeve.

10 Claims, 8 Drawing Sheets

BEARING STRUCTURE, MOTOR, AND FAN APPARATUS

BACKGROUND OF THE INVENTION

1. Field of the Invention

The present invention relates to a bearing structure, a motor, and a fan apparatus.

2. Description of the Related Art

In known bearing structures for use in fans, motors, or the like, a plurality of ribs extending in an axial direction are typically provided on an inner surface of a cavity portion of a sleeve support portion arranged to support a sleeve having a rotating shaft inserted therein. The ribs press the sleeve, which is press fitted within the sleeve support portion, radially inward to retain the sleeve.

Such bearing structures have some disadvantages. For example, when the pressing force applied by the ribs of the sleeve support portion onto the sleeve is too small, the positioning of the sleeve and the rotating shaft may become so insufficient that a problem, such as sway of the rotating shaft, may occur. On the other hand, when the pressing force applied by the ribs of the sleeve support portion onto the sleeve is too large, the sleeve may be excessively compressed by the pressing force from the ribs such that the sleeve may be deformed, resulting in a failure to support the rotating shaft stably. Moreover, in some cases, the optimum amount of the pressing force to be applied by the ribs onto the sleeve varies at different axial positions on the sleeve.

For instance, an axial center of gravity of a rotating body including the rotating shaft is sometimes located in that portion of the cavity portion of the sleeve support portion which is located toward an opening portion, in an axial direction of the sleeve. Therefore, more careful control of the amount of the pressing force applied by the ribs onto the sleeve is required for that portion of the cavity portion than for the other portions.

SUMMARY OF THE INVENTION

According to a preferred embodiment of the present invention, there is provided a bearing structure including a rotating shaft; a sleeve being substantially tubular and having the rotating shaft inserted therein such that the rotating shaft is rotatable; a sleeve support portion having a bottom and being substantially tubular, extending in an axial direction, and arranged to support the sleeve; and a base portion connected to an axial end of the sleeve support portion. The sleeve support portion preferably includes an opening portion arranged to receive the rotating shaft; a cavity portion being continuous with the opening portion and arranged to contain the sleeve; and a plurality of ribs provided on an inner surface of the cavity portion and extending in the axial direction, the ribs being spaced from each other in a circumferential direction centered on the rotating shaft. Each of the ribs includes a contact surface arranged to make contact with at least a portion of an outer surface of the sleeve. The ribs are preferably defined by a plurality of types of ribs, each type of the ribs being different in an axial position of an axial edge of the contact surface on an axially opening portion side.

According to another preferred embodiment of the present invention, there is provided a bearing structure preferably including a rotating shaft; a sleeve being substantially tubular and having the rotating shaft inserted therein such that the rotating shaft is rotatable; a sleeve support portion having a bottom and being substantially tubular, extending in an axial direction, and arranged to support the sleeve; and a base portion connected to an axial end of the sleeve support portion. The sleeve support portion preferably includes an opening portion arranged to receive the rotating shaft; a cavity portion being continuous with the opening portion and arranged to contain the sleeve; and a plurality of ribs provided on an inner surface of the cavity portion and extending in the axial direction, the ribs being spaced from each other in a circumferential direction centered on the rotating shaft, and arranged to make contact with at least a portion of the sleeve. Each of the ribs includes an opposed surface raised toward an outer surface of the sleeve relative to the inner surface of the cavity portion, and opposed to the outer surface of the sleeve. At least one of the ribs is a varied projection dimension rib, in which a radial distance between the opposed surface and a shaft center of the rotating shaft varies with respect to the axial direction in at least a partial section of an entire length thereof along the axial direction.

According to yet another preferred embodiment of the present invention, there is provided a bearing structure including a rotating shaft; a sleeve being substantially tubular and having the rotating shaft inserted therein such that the rotating shaft is rotatable; a sleeve support portion having a bottom and being substantially tubular, extending in an axial direction, and arranged to support the sleeve; and a base portion connected to an axial end of the sleeve support portion. The sleeve support portion preferably includes an opening portion arranged to receive the rotating shaft; a cavity portion being continuous with the opening portion and arranged to contain the sleeve; and a plurality of ribs provided on an inner surface of the cavity portion and extending in the axial direction, the ribs being spaced from each other in a circumferential direction centered on the rotating shaft, and arranged to make contact with at least a portion of an outer surface of the sleeve. At least one of the ribs is a varied width rib, whose width in the circumferential direction varies with respect to the axial direction in at least a partial section of an entire length thereof along the axial direction.

In bearing structures according to preferred embodiments of the present invention, a plurality of ribs including the contact surface arranged to make contact with at least a portion of the outer surface of the sleeve are provided on the inner surface of the cavity portion of the sleeve support portion, and the ribs are preferably defined by a plurality of types of ribs, each type of the ribs being different in the axial position of the axial edge of the contact surface on the axially opening portion side. Despite their simple structure the number of ribs that make contact with the sleeve can be reduced to easily optimize the amount of pressing force applied by the ribs onto the sleeve for that portion of the sleeve which is located toward the axially opening portion side so that an appropriate reduction in the pressing force can be achieved to reduce deformation of the sleeve (e.g., to prevent an excessive reduction in inside diameter of the sleeve). A greater number of ribs are arranged to make contact with a remaining portion of the sleeve which is located on the opposite side to the axially opening portion side, as compared to the number of ribs arranged to make contact with that portion of the sleeve which is located toward the axially opening portion side. This contributes to pressing the sleeve securely so as to ensure stable support of the sleeve, while reducing the deformation of the sleeve caused by circumferential variations in the pressing force applied by the ribs onto the sleeve.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

First Preferred Embodiment

Figure 1:
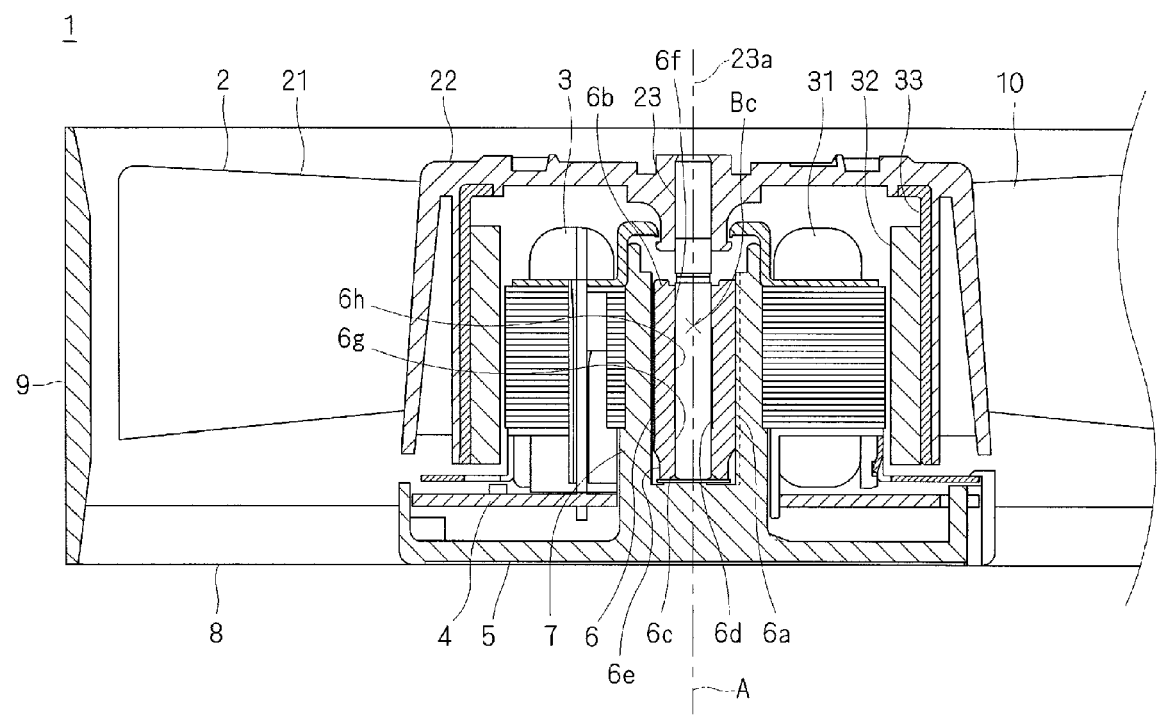
FIG. 1 is a cross-sectional view of a fan apparatus to which a bearing structure according to a first preferred embodiment of the present invention is applied.

Referring to FIG. 1, a fan apparatus 1 preferably includes an impeller 2, a motor 3, a circuit board 4, a base portion 5, a sleeve 6, a sleeve support portion 7, a plurality of stationary vanes 8, and an outer frame portion 9. The impeller 2 preferably includes a plurality of rotor blades 21, a rotor blade support portion 22, and a rotating shaft 23. The motor 3 preferably includes an armature 31, which is a stationary motor component; and a rotor magnet 32 and a rotor holder 33, all of which are rotating motor components. Of these components, all components that are arranged to rotate on the rotating shaft 23 together with the rotating shaft 23 form portions of a rotating body 10. In other words, the impeller 2, the rotor magnet 32, and the rotor holder 33 form parts of the rotating body 10. In the following description, for the sake of convenience, the side where the impeller 2 is arranged and the side where the stationary vanes 8 are arranged, along an axial direction A of the rotating shaft 23, are assumed to be an upper side and a lower side, respectively. However, note that the axial direction A may not necessarily coincide with the direction of gravity.

The rotor blade support portion 22 is preferably substantially cup-shaped, and arranged to surround the motor 3. The rotor blades 21, which extend radially outward, are provided on an outer surface of the rotor blade support portion 22. The rotor blades 21 are preferably arranged at regular intervals in a circumferential direction. The rotor holder 33, which is preferably made of metal and substantially cylindrical, is provided on an inner surface of the rotor blade support portion 22. The rotor magnet 32, which is substantially cylindrical, is fixed to an inner circumferential surface of the rotor holder 33 by, for example, press fitting, via an adhesive, or any other suitable attachment method. The rotating shaft 23 is located substantially in the center of the rotor blade support portion 22, and is provided integrally with the rotor blades 21, the rotor blade support portion 22, and the rotor holder 33 by injection molding, for example. Grooves are preferably formed by knurling or the like, for example, on an outer surface of a top portion (with respect to the axial direction A) of the rotating shaft 23. During the injection molding, resin flows into the grooves, so that the rotating shaft 23 and the rotor blade support portion 22 are firmly coupled with each other.

The armature 31 of the motor 3 is supported by the base portion 5 as described below. The armature 31 and the rotor magnet 32 are arranged radially opposite to each other. The circuit board 4, which is positioned below the armature 31 with respect to the axial direction A, is fixed to the base portion 5, and electrically connected to the armature 31 via conductive pins or the like, for example. In addition, the circuit board 4 includes a circuit designed to control current supplied to the motor 3, and is electrically connected to an external power supply (not shown) via a lead wire (not shown) or the like. Once the current, a control signal, and so on are supplied to the armature 31 from the external power supply via the lead wire or the like and the circuit board 4, torque is produced due to electromagnetic interaction between the armature 31 and the rotor magnet 32. This causes the rotating body 10 including the impeller 2 to rotate on a shaft center 23a of the rotating shaft 23, allowing the rotor blades 21 to produce a flow of air substantially in the axial direction A.

The base portion 5 has a bottom, is substantially cylindrical, is positioned radially inward of the outer frame portion 9, and is arranged to support the armature 31 of the motor 3 and the circuit board 4. Moreover, a lower end (with respect to the axial direction A) of the sleeve support portion 7 is connected to the base portion 5. The structures of the sleeve 6 and the sleeve support portion 7 will be described in detail below.

The stationary vanes 8 are arranged upstream or downstream of the rotor blades 21 of the impeller 2 with respect to the flow of air generated by the rotation of the rotor blades 21, and control the flow of air taken in or sent out by the rotor blades 21. In the present preferred embodiment, the stationary vanes 8 are arranged below the rotor blades 21, downstream thereof, with respect to the axial direction A. The stationary vanes 8 are arranged at regular intervals in the circumferential direction between the outer frame portion 9 and the base portion 5. The stationary vanes 8 have both ends thereof joined to the outer frame portion 9 and the base portion 5, to support the base portion 5. The outer frame portion 9 is arranged to surround the impeller 2. The base portion 5, the sleeve support portion 7, the stationary vanes 8, and the outer frame portion 9 may be formed integrally by molding using resin or metal (e.g., aluminum) to define a single continuous member, for example. An example of a die applicable in this molding process is a type of mold that allows the mold to release in the axial direction A.

The sleeve 6 is preferably substantially tubular (and in the present preferred embodiment, substantially cylindrical), and has the rotating shaft 23 inserted therein such that the rotating shaft is rotatable. The sleeve 6 is, for example, made of porous sintered metal obtained by heating and consolidating metal particles, and is impregnated with lubricating fluid such as oil. The lubricating fluid, exuding from the sleeve 6, reduces friction between the sleeve 6 and the rotating shaft 23.

An upper small diameter portion 6f, a lower small diameter portion 6g, and an intermediate large diameter portion 6h are provided on an inner surface 6d of the sleeve 6. During a process of producing the sleeve 6, a reduced diameter portion 6e, with a decreased outer diameter, is defined at a lower end portion (with respect to the axial direction A) of an outer surface of the sleeve 6.

The upper small diameter portion 6f and the lower small diameter portion 6g, which have substantially the same inside diameter, are provided at an upper end portion and a lower end portion (with respect to the axial direction A), respectively, of the inner surface 6d of the sleeve 6. The intermediate large diameter portion 6h, which has a larger inside diameter than those of the upper and lower small diameter portions 6f and 6g, is provided between the upper and lower small diameter portions 6f and 6g along the axial direction A. A suitable gap is secured between the intermediate large diameter portion 6h and the rotating shaft 23. A purpose of the provision of the intermediate large diameter portion 6h is to reduce an area of contact between the inner surface 6d of the sleeve 6 and the rotating shaft 23, and thereby reduce frictional resistance. An additional purpose of the provision of the intermediate large diameter portion 6h is to secure space to retain the lubricating fluid inside the sleeve 6. Accordingly, in that portion of the sleeve 6 where the intermediate large diameter portion 6h is provided, deformation of the inner surface 6d of the sleeve 6 which might be caused by a pressing force applied by ribs 73 and 74 would be less likely to affect the support of the rotating shaft 23.

A method of producing the sleeve 6 will now be described briefly below. A substantially tubular object is first formed by, for example, powder pressing, and the upper small diameter portion 6f and the intermediate large diameter portion 6h are formed on the inner surface 6d of the substantially tubular object. At this stage, the lower small diameter portion 6g has not been formed yet, and a portion corresponding to the lower small diameter portion 6g has substantially the same inside diameter as that of the intermediate large diameter portion 6h. At this stage, the outer diameter of an outer surface of the substantially tubular object is substantially the same throughout the length thereof along the axial direction A. Then, this aggregate of solid particles obtained by the powder pressing is heated to form a sintered body of the above-described shape.

Next, a sizing bar having an outer diameter substantially the same as the inside diameter of the upper small diameter portion 6f is inserted in the center of the sintered body. Further, the sintered body is subjected to press working such that a lower end portion (with respect to the axial direction A) of an outer surface of the sintered body is pressed against the sizing bar. As a result, the lower small diameter portion 6g, whose inside diameter is substantially the same as the outer diameter of the sizing bar, is formed at a lower end portion (with respect to the axial direction A) on an inner surface of the sintered body. In addition, the reduced diameter portion 6e, which is smaller in outer diameter than an outer surface 6a of the sleeve 6, is formed at the lower end portion (with respect to the axial direction A) of the outer surface of the sintered body, as a result of the above-described press working.

Figure 2:
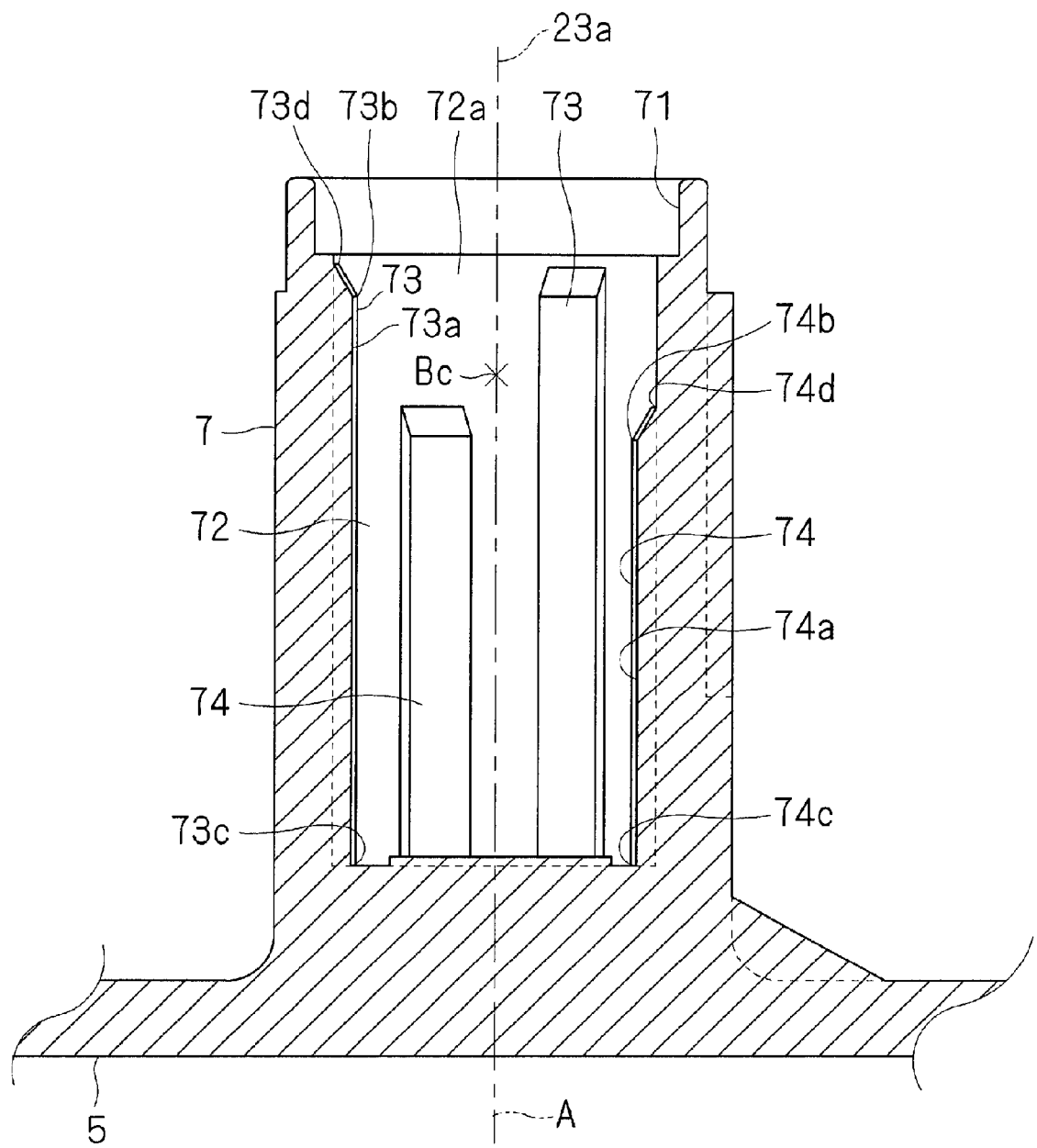
FIG. 2 is a cross-sectional view of a sleeve support portion provided in the fan apparatus as illustrated in FIG. 1.
Figure 3:
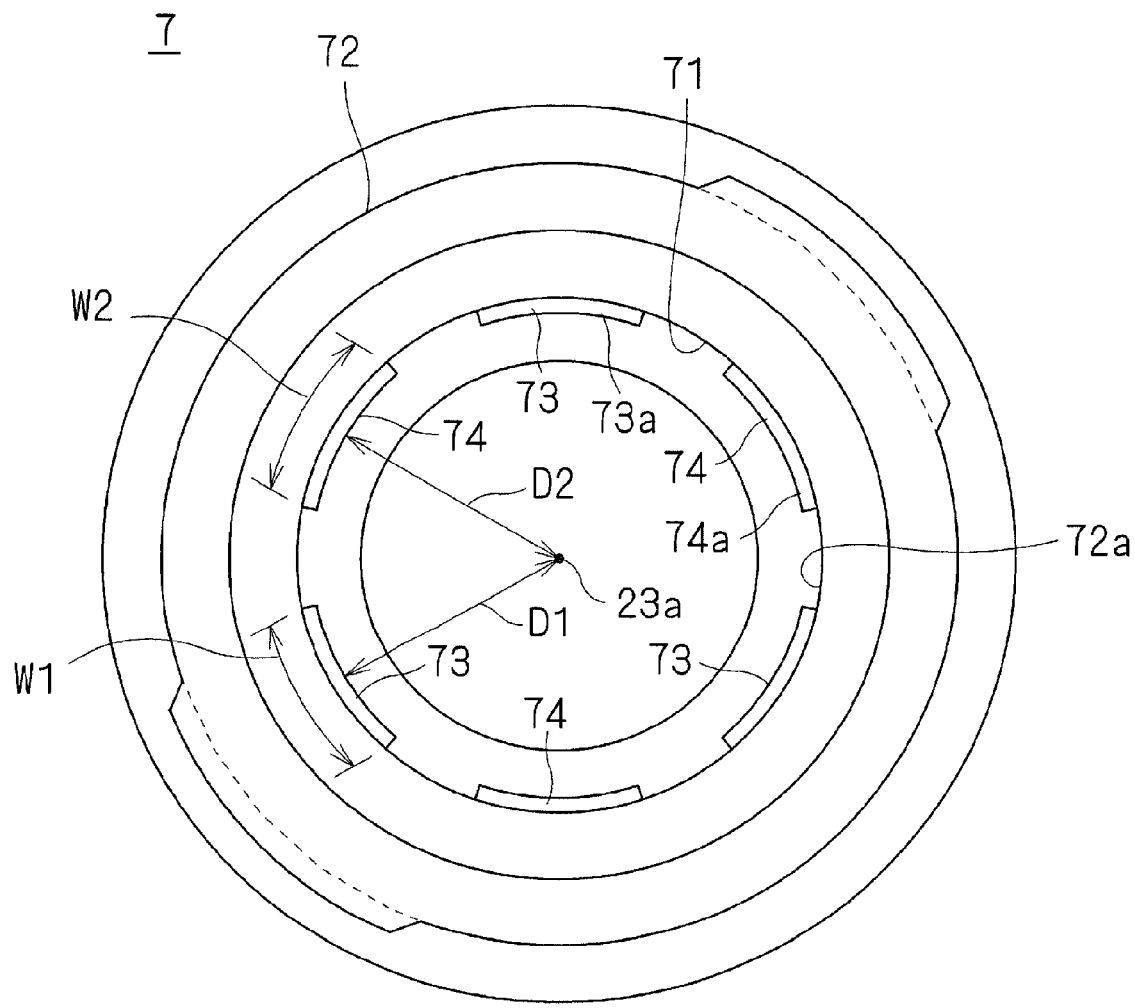
FIG. 3 is a plan view of the sleeve support portion as illustrated in FIG. 2, as viewed from above in an axial direction.

As illustrated in FIGS. 2 and 3, the sleeve support portion 7 extends along the axial direction A, has a bottom and is substantially tubular and thus surrounds and supports the sleeve 6. In more detail, the sleeve support portion 7 is provided with an opening portion 71, a cavity portion 72, and a plurality of ribs 73 and 74.

The opening portion 71 is provided at an upper end (with respect to the axial direction A) of the sleeve support portion 7, and is arranged to receive the rotating shaft 23 and the sleeve 6. Note that an additional opening portion may be provided at a lower end (with respect to the axial direction A) of the sleeve support portion 7. In this case, at the time of production, the sleeve 6 may be inserted through the additional opening portion at the lower end and, for example, press fit within the sleeve support portion 7, and then the additional opening portion at the lower end may be closed.

The cavity portion 72 is provided below the opening portion 71 with respect to the axial direction A, and is continuous with the opening portion 71, and arranged to contain the sleeve 6. In the present preferred embodiment, an inner surface 72a of the cavity portion 72 is substantially in the shape of a cylinder extending along the axial direction A.

The plurality of ribs 73 and 74 are provided on the inner surface 72a of the sleeve support portion 7, and extend substantially in the axial direction A. The ribs 73 and 74 are arranged to be spaced from one another in a circumferential direction centered on the rotating shaft 23. In addition, the ribs 73 and 74 have contact surfaces 73a and 74a which are arranged to make contact with at least a portion of the outer surface 6a of the sleeve 6. After the sleeve 6 is inserted through the opening portion 71 and press fit within the cavity portion 72, the contact surfaces 73a and 74a of the ribs 73 and 74 are in contact with the outer surface 6a of the sleeve 6 so as to be pressed radially inward against the outer surface 6a of the sleeve 6. This allows the sleeve 6 to be positioned and held within the cavity portion 72. In a situation where the sleeve 6 is held within the cavity portion 72, both ends 6b and 6c (with respect to the axial direction A) of the sleeve 6 are located within the cavity portion 72 (see FIG. 1). In more detail, in a situation where the rotating shaft 23 is inserted in the sleeve 6 held within the cavity portion 72, a lower end (with respect to the axial direction A) of the rotating shaft 23 and the lower end 6c (with respect to the axial direction A) of the sleeve 6 are located at a bottom of the cavity portion 72, i.e., at a lower end (with respect to the axial direction A) of the cavity portion 72.

Referring to FIG. 2, the ribs 73 and 74 as described above have edge positions 73b and 74b at edges of the contact surfaces 73a and 74a on a side (with respect to the axial direction A) where the opening portion 71 is provided (this side will be hereinafter referred to simply as an "axially opening portion side" as appropriate). The edge positions 73b and 74b have a plurality of positions, each of the positions being different with respect to the axial direction A. In the present preferred embodiment, there are two types of ribs, i.e., greater-length ribs 73 and shorter-length ribs 74. The edge position 73b of the contact surface 73a of each of the greater-length ribs 73 is arranged closer to the axially opening portion side than the edge position 74b of the contact surface 74a of each of the shorter-length ribs 74. Edge positions 73c and 74c of the contact surfaces 73a and 74a of the greater-length and shorter-length ribs 73 and 74, on an opposite side to the axially opening portion side, are at substantially the same position with respect to the axial direction A. In the present preferred embodiment, the edge positions 73c and 74c of the greater-length and shorter-length ribs 73 and 74 are located at a lower end (with respect to the axial direction A) of the cavity portion 72, on the opposite side to the axially opening portion side. Note that, in the present preferred embodiment, the edge positions 73c and 74c substantially coincide with positions of ends of the ribs 73 and 74 on the opposite side to the axially opening portion side.

The number of greater-length ribs 73 as described above is at least one (three in the present preferred embodiment), and the number of shorter-length ribs 74 is at least one (three in the present preferred embodiment) (see FIG. 3). The greater-length and shorter-length ribs 73 and 74 are arranged alternately and at regular intervals in the circumferential direction, and arranged to be axially symmetrical with respect to the shaft center 23a.

Referring to FIG. 2, a center of gravity Bc of the rotating body 10 is either located at substantially the same axial position as an end 73d or 74d, on the axially opening portion side, of the rib 73 or 74 that is most on the axially opening portion side of all the plurality of ribs 73 and 74, or located more on the cavity portion 72 side with respect to the axial direction A (this side will be hereinafter referred to as an "axially cavity portion side" as appropriate) than that end 73d or 74d. Specifically, in the present preferred embodiment, the center of gravity Bc of the rotating body 10 is either located at substantially the same axial position as the end 73d of the greater-length ribs 73 on the axially opening portion side, or located more on the axially cavity portion side than that end 73d. In more detail, in the present preferred embodiment, the center of gravity Bc of the rotating body 10 is located between the edge position 73b of the contact surface 73a of the greater-length ribs 73 and the edge position 74b of the contact surface 74a of the shorter-length ribs 74 with respect to the axial direction A.

Moreover, in the present preferred embodiment, the end 6b of the sleeve 6 on the axially opening portion side is located, with respect to the axial direction A, between the edge position 73b of the contact surface 73a of the greater-length ribs 73 and the edge position 74b of the contact surface 74a of the shorter-length ribs 74. Note, however, that the center of gravity Bc of the rotating body 10 is located, with respect to the axial direction A, more on the axially cavity portion side than the end 6b of the sleeve 6 on the axially opening portion side, but toward the axially opening portion side.

In the present preferred embodiment, the center of gravity Bc of the rotating body 10 is located in that portion of the sleeve 6 which is located toward the axially opening portion side. Therefore, the amount of the pressing force applied by the greater-length and shorter-length ribs 73 and 74 to that portion of the sleeve 6 which is located toward the axially opening portion side is a very important factor for stable support of the rotating shaft 23.

In this connection, in the present preferred embodiment, the contact surfaces 73a and 74a of the greater-length and shorter-length ribs 73 and 74 provided on the inner surface 72a of the cavity portion 72 of the sleeve support portion 7 have different edge positions 73b and 74b with respect to the axial direction A, as described above. In addition, the center of gravity Bc of the rotating body 10 is located, with respect to the axial direction A, between the edge position 73b of the contact surface 73a of the greater-length ribs 73 and the edge position 74b of the contact surface 74a of the shorter-length ribs 74. Accordingly, only the contact surfaces 73a of the greater-length ribs 73, and not the contact surfaces 74a of the shorter-length ribs 74, make contact with the outer surface 6a of that portion of the sleeve 6 which is located toward the axially opening portion side and where the center of gravity Bc of the rotating body 10 is located.

Further, in the present preferred embodiment, the reduced diameter portion 6e is provided on the outer surface of the sleeve 6, as described above. Neither the greater-length ribs 73 nor the shorter-length ribs 74 make contact with the reduced diameter portion 6e. That is, each of the greater-length and shorter-length ribs 73 and 74 makes contact with only the other portions of the outer surface 6a than the reduced diameter portion 6e, so as to ensure a sufficient strength of the support of the sleeve 6 by the sleeve support portion 7. Thus, the support strength increases as the number of ribs increases. In the present preferred embodiment, the combined total number of the greater-length and shorter-length ribs is six, but it should be noted that any desirable number of ribs could be provided.

Notice here that an increase in the support strength leads to an increase in radially inward deformation of the inner surface 6d of the sleeve 6. As such, in the present preferred embodiment, regarding that portion of the sleeve 6 which is located at an end portion on the axially opening portion side and where the upper small diameter portion 6f is provided on the inner surface 6d of the sleeve 6 also, countermeasures against the radially inward deformation can be taken, as described above, by arranging only the contact surfaces 73a of the greater-length ribs 73, and not the contact surfaces 74a of the shorter-length ribs 74, to make contact with the outer surface 6a of that portion, for example.

Regarding the intermediate large diameter portion 6h, a relatively large radial gap is secured between the rotating shaft 23 and the intermediate large diameter portion 6h. Therefore, characteristics of the bearing mechanism will seldom be affected by a slight radially inward deformation of the intermediate large diameter portion 6h which may be caused by the pressure applied radially from the outside. In the present preferred embodiment, both the greater-length and shorter-length ribs 73 and 74 make contact with that portion of the outer surface 6a which is located radially outward of the intermediate large diameter portion 6h, so as to ensure sufficient support strength thereat.

This allows an appropriate reduction in the radially inward pressing force applied onto that portion of the sleeve 6 which is located toward the axially opening portion side and where the center of gravity Bc of the rotating body 10 and the upper small diameter portion 6f of the sleeve 6 are located. Moreover, it is made easier to optimize the amount of the pressing force applied by the ribs 73 and 74, to reduce any deformation of the sleeve 6 (e.g., to prevent an excessive reduction in the inside diameter of the sleeve 6). Further, both the contact surfaces 73a of the greater-length ribs 73 and the contact surfaces 74a of the shorter-length ribs 74 make contact with that portion of the outer surface 6a of the sleeve 6 which is located on the axially cavity portion side of both a portion thereof corresponding to the position of the center of gravity Bc of the rotating body 10 and a portion thereof corresponding to the upper small diameter portion 6f. Therefore, the number of ribs that press the sleeve 6 is greater, by the number of shorter-length ribs 74, at that portion of the outer surface 6a of the sleeve 6 which is located on the axially cavity portion side of both the portion thereof corresponding to the position of the center of gravity Bc of the rotating body 10 and the portion thereof corresponding to the upper small diameter portion 6f than at the portion thereof corresponding to the upper small diameter portion 6f. This contributes to reducing the deformation of the sleeve 6 caused by circumferential variations in the pressing force applied by the greater-length and shorter-length ribs 73 and 74 onto the sleeve 6, while pressing the sleeve 6 securely to ensure the stable support of the sleeve 6. Furthermore, the greater-length ribs 73 apply necessary pressing force onto that portion of the sleeve 6 which is located toward the axially opening portion side and where the center of gravity Bc of the rotating body 10 is located, to position the sleeve 6 and ensure the stable support of the sleeve 6.

Furthermore, the greater-length and shorter-length ribs 73 and 74 are arranged alternately in the circumferential direction. Therefore, the pressing force applied by the greater-length ribs 73 onto that portion of the sleeve 6 which is located toward the axially opening portion side is well balanced with respect to the circumferential direction. Thus, the circumferential variations in the pressing force applied by the greater-length ribs 73 onto the sleeve 6 are reduced, so that the deformation of the sleeve 6 can be reduced.

Furthermore, the greater-length and shorter-length ribs 73 and 74 are arranged to be axially symmetrical with respect to the shaft center 23a. This allows the pressing force applied by the greater-length and shorter-length ribs 73 and 74 onto the sleeve 6 to be axially symmetrical with respect to the shaft center 23a. This allows the sleeve 6 to be stably supported by the greater-length and shorter-length ribs 73 and 74, and contributes to reducing the circumferential variations in the pressing force applied by the greater-length and shorter-length ribs 73 and 74 onto the sleeve 6, to reduce the deformation of the sleeve 6.

Furthermore, in the present preferred embodiment, both ends 6b and 6c of the sleeve 6 with respect to the axial direction A are located within the cavity portion 72 of the sleeve support portion 7. Therefore, the majority of the entire length of the sleeve 6 along the axial direction A is pressed by the greater-length and shorter-length ribs 73 and 74 of the sleeve support portion 7, to ensure the stable support of the sleeve 6. Moreover, in the case where the lubricating fluid is used to reduce the friction between the sleeve 6 and the rotating shaft 23, the lubricant is less likely to leak out from within the cavity portion 72 of the sleeve support portion 7.

Referring to FIG. 3, in the present preferred embodiment, a circumferential width W1 of the greater-length ribs 73 is substantially equal to a circumferential width W2 of the shorter-length ribs 74. Note, however, that the circumferential widths W1 and W2 may have different values in other preferred embodiments of the present invention.

Also, referring to FIG. 3, in the present preferred embodiment, a radial distance D1 between the contact surface 73a of the greater-length rib 73 and the shaft center 23a and a radial distance D2 between the contact surface 74a of the shorter-length rib 74 and the shaft center 23a are set at substantially the same value, before the sleeve 6 is, for example, press fitted within the sleeve support portion 7. Note, however, that the radial distances D1 and D2 may be set at different values in other preferred embodiments of the present invention.

In the present preferred embodiment, both the number of greater-length ribs 73 and the number of shorter-length ribs 74 are three. Note, however, that both the number of greater-length ribs 73 and the number of shorter-length ribs 74 may be two or more than three in other preferred embodiments of the present invention. Also note that the number of greater-length ribs 73 and the number of shorter-length ribs 74 may be different in other preferred embodiments of the present invention.

Figure 4:
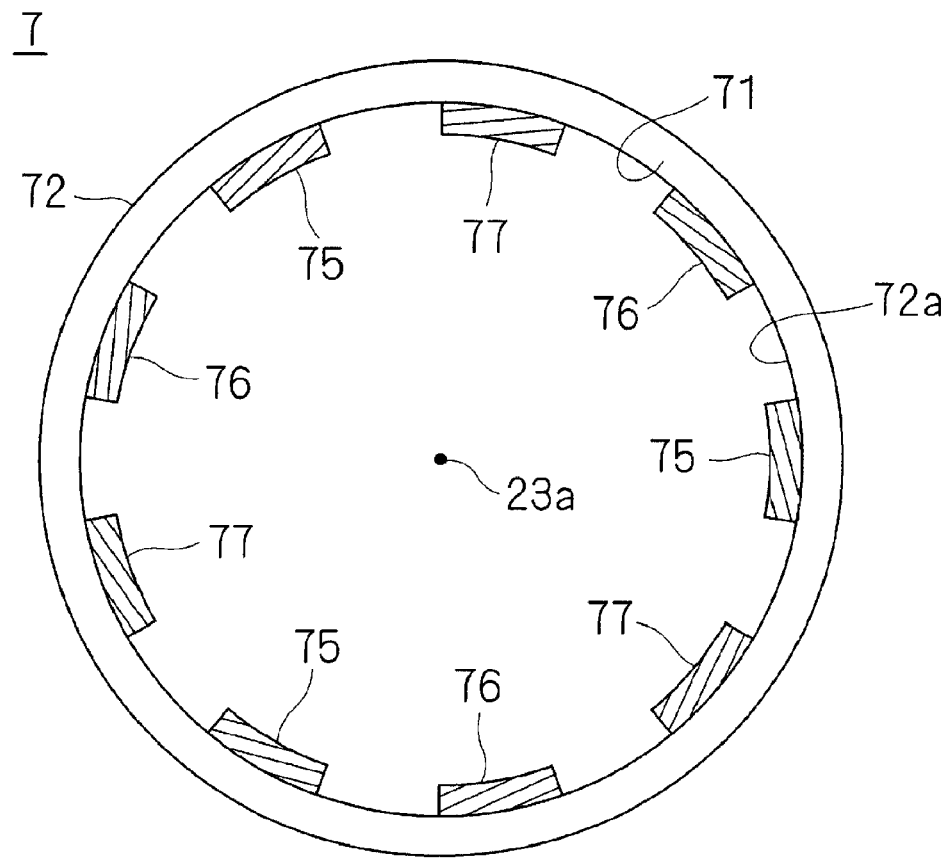
FIG. 4 is a diagram illustrating a variation of the structure of the sleeve support portion as illustrated in FIG. 3.

In the present preferred embodiment, two types of ribs, i.e., the greater-length ribs 73 and the shorter-length ribs 74, are provided. Note, however, that in other preferred embodiments of the present invention, three or more types of ribs may be provided, each type of ribs being different in the edge position of the contact surface on the axially opening portion side with respect to the axial direction A. In a preferred embodiment as illustrated in FIG. 4, for example, three types of ribs 75, 76, and 77, with three ribs for each type, are arranged at regular intervals in the circumferential direction so as to be axially symmetrical with respect to the shaft center 23a. As to the edge position of the contact surface on the axially opening portion side in the three types of ribs, the edge position of the ribs 75 is located most on the axially opening portion side, the edge position of the ribs 77 is located most on the axially cavity portion side, and the edge position of the ribs 76 is located at an intermediate position between them.

Second Preferred Embodiment

Figure 5:
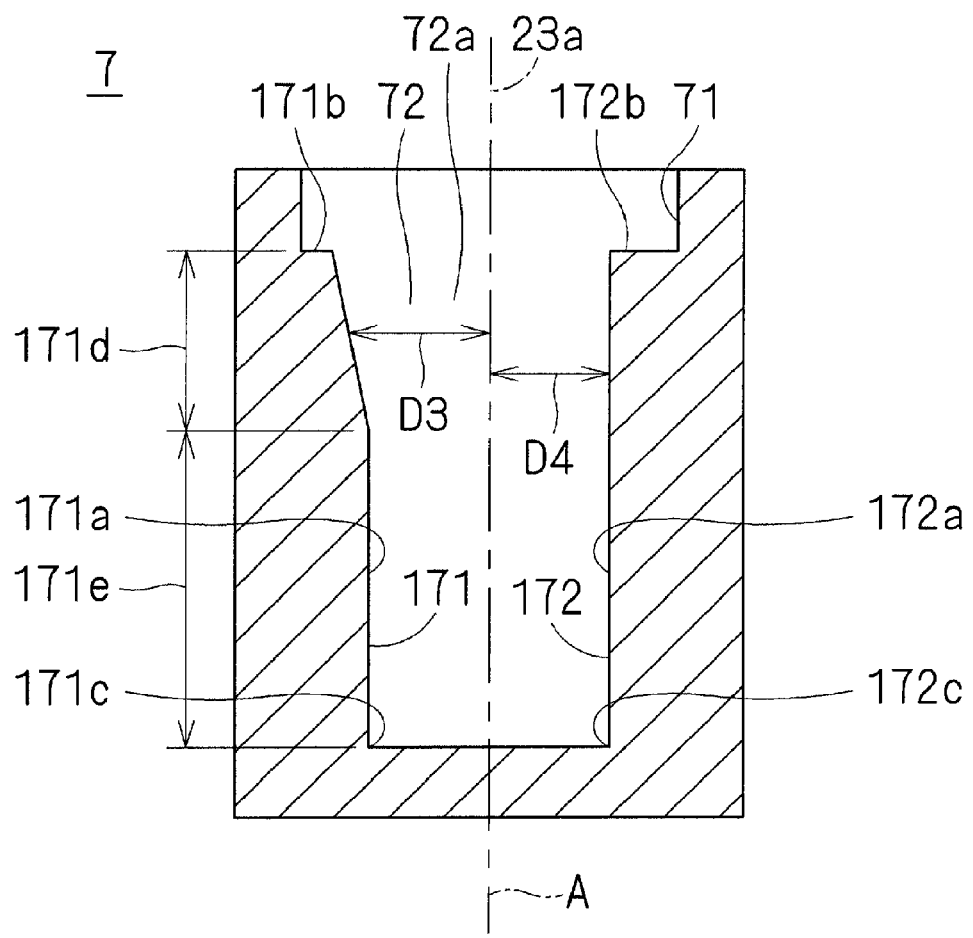
FIG. 5 is a cross-sectional view of a sleeve support portion provided in a fan apparatus to which a bearing structure according to a second preferred embodiment of the present invention is applied.

FIG. 5 is a cross-sectional view of a sleeve support portion 7 provided in a fan apparatus 1 to which a bearing structure according to a second preferred embodiment of the present invention is applied. The fan apparatus 1 according to the present preferred embodiment is essentially identical to the fan apparatus 1 according to the first preferred embodiment except in the structure of ribs 171 and 172. Accordingly, like portions are designated by like reference numerals and redundant description is omitted.

Referring to FIG. 5, in the present preferred embodiment, at least one of the ribs 171 and 172 provided on the inner surface 72a of the sleeve support portion 7 is not uniform in the radial dimension, i.e., in how far it projects from the inner surface 72a of the sleeve support portion 7 toward the shaft center 23a. This type of ribs will be referred to as "varied projection dimension ribs" as appropriate. In at least a partial section of the axial length (along the axial direction A) of each varied projection dimension rib 171, a radial distance D3 between the shaft center 23a and an opposed surface 171a of the varied projection dimension rib 171, which is opposed to the outer surface 6a of the sleeve 6, varies with respect to the axial direction A.

In the present preferred embodiment, at least one varied projection dimension rib 171 and at least one uniform projection dimension rib 172 are provided on the inner surface 72a of the sleeve support portion 7. As to the uniform projection dimension rib 172, a radial distance D4 between the shaft center 23a and an opposed surface 172a of the uniform projection dimension rib 172, which is opposed to the outer surface 6a of the sleeve 6, is substantially uniform along an entire length of the uniform projection dimension rib 172 along the axial direction A. More specifically, in the present preferred embodiment, a plurality of (e.g., three) varied projection dimension ribs 171 and a plurality of (e.g., three) uniform projection dimension ribs 172 are arranged at regular intervals in the circumferential direction to be axially symmetrical with respect to the shaft center 23a. In a variation of the present preferred embodiment, all the ribs provided on the inner surface 72a of the sleeve support portion 7 may be composed of varied projection dimension ribs 171. Both ends 171b and 171c (with respect to the axial direction A) of the varied projection dimension rib 171 are located at substantially the same axial positions as both ends 172b and 172c, respectively, of the uniform projection dimension rib 172. In more detail, in the present preferred embodiment, the end 171c of the varied projection dimension rib 171 on the axially cavity portion side (i.e., on the lower side with respect to the axial direction A) and the end 172c of the uniform projection dimension rib 172 on the axially cavity portion side (i.e., on the lower side with respect to the axial direction A) are located at the end of the cavity portion 72 on the axially cavity portion side (i.e., on the lower side with respect to the axial direction A).

In addition, in the present preferred embodiment, an enlarging section 171d is provided at an end portion of the varied projection dimension rib 171 on the axially opening portion side. In the enlarging section 171d, the distance D3 between the opposed surface 171a and the shaft center 23a gradually increases toward the axially opening portion side. A uniform section 171e, where the distance D3 is uniform with respect to the axial direction A, is provided at that portion of the varied projection dimension rib 171 which is located on the axially cavity portion side of the enlarging section 171d in the opposed surface 171a. In a variation of the present preferred embodiment, the enlarging section 171d may extend over substantially the entire length of the opposed surface 171a of the varied projection dimension rib 171 along the axial direction A.

As such, the sleeve 6 has a portion with which the enlarging section 171d of the opposed surface 171a of the varied projection dimension rib 171 makes contact. In this portion of the sleeve 6 opposite to the enlarging section 171d, the amount of the pressing force applied by the opposed surface 171a of the varied projection dimension rib 171 decreases toward the axially opening portion side.

Also in the present preferred embodiment, the center of gravity Bc of the rotating body 10 is located in that portion of the sleeve 6 which is located toward the axially opening portion side with respect to the axial direction A. In addition, the center of gravity Bc of the rotating body 10 is either located at substantially the same axial position as the ends 171b and 172b of the varied and uniform projection dimension ribs 171 and 172 on the axially opening portion side, or located more on the axially cavity portion side than the ends 171b and 172b. Therefore, the enlarging section 171d of the opposed surface 171a of the varied projection dimension rib 171 substantially corresponds to that portion of the outer surface 6a of the sleeve 6 where the center of gravity Bc of the rotating body 10 is located.

In addition, in the present preferred embodiment, it is possible to allow the enlarging section 171d of the opposed surface 171a of the varied projection dimension rib 171 to correspond to an end portion of the outer surface 6a of the sleeve 6 on the axially opening portion side where the upper small diameter portion 6f is provided on the inner surface 6d of the sleeve 6.

This allows an appropriate reduction in the radially inward pressing force applied onto that portion of the sleeve 6 which is located toward the axially opening portion side and where the center of gravity Bc of the rotating body 10 and the upper small diameter portion 6f of the sleeve 6 are located. Moreover, it is made easier to optimize the amount of the pressing force applied by the ribs 171 and 172, to reduce the deformation of the sleeve 6 (e.g., to prevent an excessive reduction in the inside diameter of the sleeve 6). In addition, the uniform section 171e of the opposed surface 171a of the varied projection dimension rib 171 and the opposed surface 172a of the uniform projection dimension rib 172 are arranged to make contact with that portion of the outer surface 6a of the sleeve 6 which is located on the axially cavity portion side of that portion of the sleeve 6 where the center of gravity Bc of the rotating body 10 is located. This leads to an increase in the number of ribs 171 and 172 pressing the sleeve 6, or in the area of contact. This contributes to reducing the deformation of the sleeve 6 caused by circumferential variations in the pressing force applied by the ribs 171 and 172 onto the sleeve 6, while allowing the ribs 171 and 172 to press the sleeve 6 securely to ensure the stable support of the sleeve 6. That is, it is possible to secure a sufficient total number of varied and uniform projection dimension ribs 171 and 172 to effectively reduce the deformation of the sleeve 6 caused by the circumferential variations in the pressing force applied by the ribs 171 and 172. In addition, the use of the varied and uniform projection dimension ribs 171 and 172 contributes to partially reducing the pressing force applied onto that portion of the sleeve 6 which is located toward the axially opening portion side and which is concerned with problems such as the problem of the excessive reduction in the inside diameter of the sleeve 6 caused by the pressing force applied by the ribs 171 and 172.

Moreover, the combined use of the varied and uniform projection dimension ribs 171 and 172 produces a beneficial effect as described below. The uniform projection dimension rib 172, in which the radial distance D4 between the opposed surface 172a and the shaft center 23a is uniform with respect to the axial direction A, applies the pressing force to the sleeve 6 substantially uniformly with respect to the axial direction A. Therefore, the uniform projection dimension rib 172 supports each axial position of the sleeve 6 stably. In addition, the additional use of the varied projection dimension rib 171 allows optimization of the amount of the pressing force applied by the varied and uniform projection dimension ribs 171 and 172 to each axial position of the sleeve 6.

Furthermore, the varied and uniform projection dimension ribs 171 and 172 are arranged alternately in the circumferential direction. This contributes to preventing the addition of the varied projection dimension ribs 171 from causing uneven circumferential distribution of the pressing force applied by the varied and uniform projection dimension ribs 171 and 172 onto the sleeve 6 (this is especially true for that portion of the sleeve 6 which is located toward the axially opening portion side). This contributes to achieving the stable support of the sleeve 6, while reducing the deformation of the sleeve 6 caused by the circumferential variations in the pressing force applied by the ribs 171 and 172 onto the sleeve 6.

Furthermore, the varied and uniform projection dimension ribs 171 and 172 are arranged to be axially symmetrical with respect to the shaft center 23a. This allows the pressing force applied by the varied and uniform projection dimension ribs 171 and 172 onto the sleeve 6 to be axially symmetrical with respect to the shaft center 23a. This allows the sleeve 6 to be stably supported by the varied and uniform projection dimension ribs 171 and 172, and contributes to reducing the circumferential variations in the pressing force applied by the ribs 171 and 172 onto the sleeve 6, to reduce the deformation of the sleeve 6.

Figure 6:
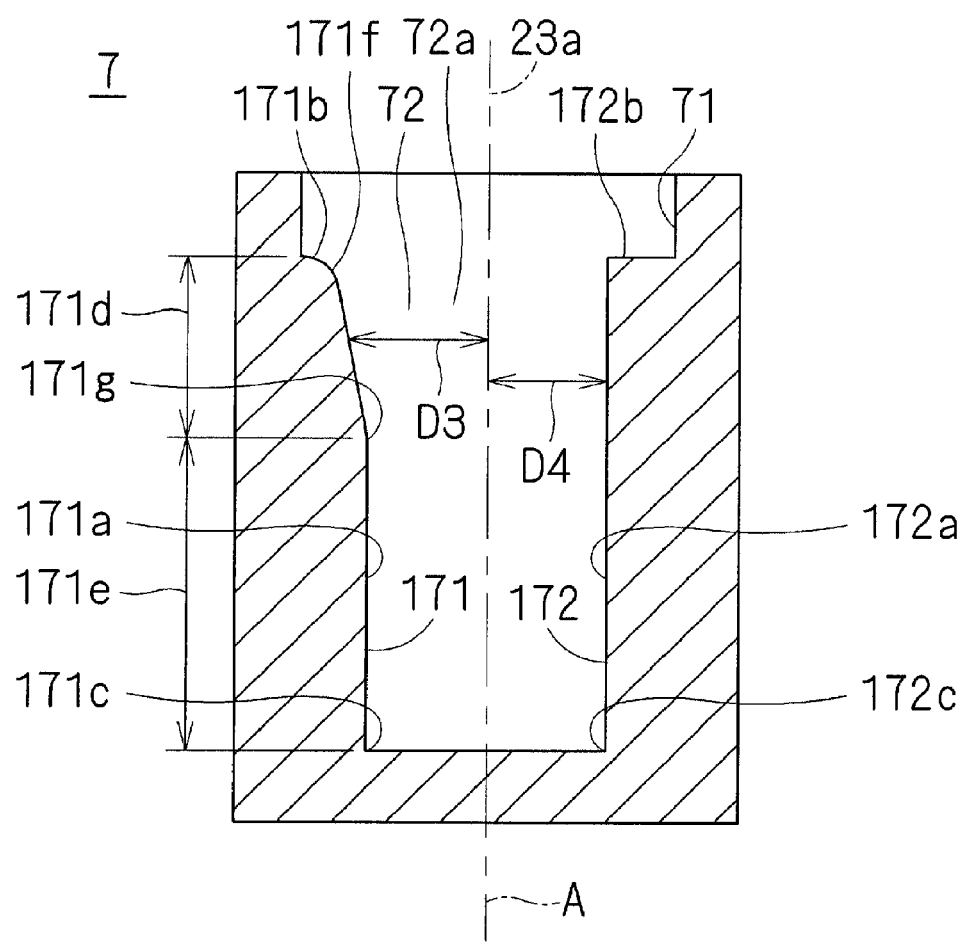
FIG. 6 is a diagram illustrating a variation of the structure of the sleeve support portion as illustrated in FIG. 5.

Referring to FIG. 6, in still another variation of the present preferred embodiment, regarding the varied projection dimension rib 171, an end 171f, on the axially opening portion side, of the enlarging section 171d of the opposed surface 171a of the varied projection dimension rib 171 and a boundary portion 171g between the enlarging section 171d and the uniform section 171e may be in the shape of a smooth curve in a section taken along the axial direction A. Note that, in addition to the shape as illustrated in FIG. 6, the opposed surface 171a of the varied projection dimension rib 171 may be in various other shapes in section taken along the axial direction A, in other preferred embodiments of the present invention.

Third Preferred Embodiment

Figures 7A, 7B:
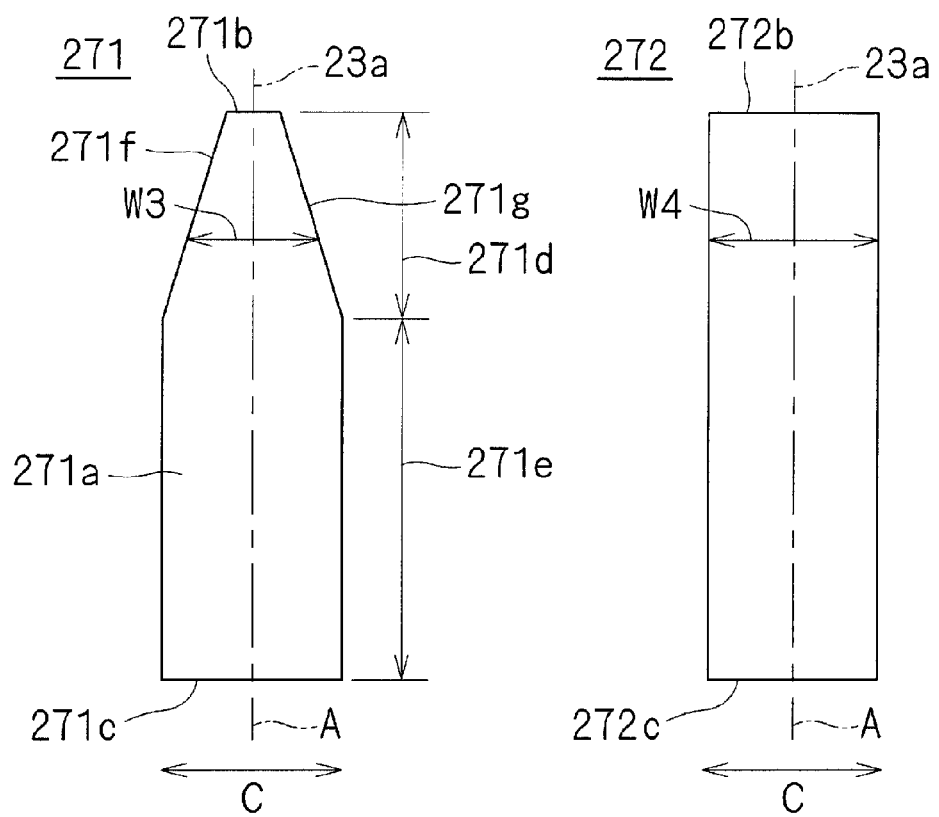
FIGS. 7A and 7B are diagrams of a varied width rib and a uniform width rib, respectively, which are provided on a sleeve support portion of a fan apparatus to which a bearing structure according to a third preferred embodiment of the present invention is applied, as viewed radially from the direction of a rotating shaft.

FIGS. 7A and 7B are diagrams of a varied width rib 271 and a uniform width rib 272, respectively, which are provided on a sleeve support portion 7 of a fan apparatus 1 to which a bearing structure according to a third preferred embodiment of the present invention is applied, as viewed radially from the direction of the rotating shaft 23. The fan apparatus 1 according to the present preferred embodiment is essentially identical to the fan apparatus 1 according to the first preferred embodiment except in the structure of the varied and uniform width ribs 271 and 272. Accordingly, like portions are designated by like reference numerals, and redundant description is omitted.

In the present preferred embodiment, as illustrated in FIGS. 7A and 7B, at least one of the ribs 271 and 272 provided on the inner surface 72a of the sleeve support portion 7 is not uniform in width. This type of ribs will be referred to as "varied width ribs" as appropriate. In at least a partial section of the axial length of each varied width rib 271, a width W3 in a circumferential direction C centered on the shaft center 23a varies with respect to the axial direction A.

In the present preferred embodiment, at least one varied width rib 271 and at least one uniform width rib 272 are provided on the inner surface 72a of the sleeve support portion 7. As to the uniform width rib 272, a width W4 in the circumferential direction C is substantially uniform over its entire axial length. More specifically, in the present preferred embodiment, a plurality of (e.g., three) varied width ribs 271 and a plurality of (e.g., three) uniform width ribs 272 are arranged at regular intervals in the circumferential direction to be axially symmetrical with respect to the shaft center 23a. In a variation of the present preferred embodiment, all the ribs provided on the inner surface 72a of the sleeve support portion 7 may be varied width ribs 271. Both ends 271b and 271c (with respect to the axial direction A) of the varied width rib 271 are located at substantially the same axial positions as both ends 272b and 272c, respectively, of the uniform width rib 272. In more detail, in the present preferred embodiment, the end 271c of the varied width rib 271 on the axially cavity portion side (i.e., on the lower side with respect to the axial direction A) and the end 272c of the uniform width rib 272 on the axially cavity portion side (i.e., on the lower side with respect to the axial direction A) are located at the end of the sleeve support portion 7 on the axially cavity portion side (i.e., on the lower side with respect to the axial direction A).

Also, in the present preferred embodiment, a decreased width section 271d is provided at an end portion of the varied width rib 271 on the axially opening portion side, while a uniform width section 271e is provided to extend from an end of the decreased width section 271d on the axially cavity portion side to the end of the varied width rib 271 on the axially cavity portion side. In the decreased width section 271d, the width W3 of the varied width rib 271 is smaller than the width W3 of the varied width rib 271 in the uniform width section 271e, and the width W3 gradually decreases toward the axially opening portion side. In the uniform width section 271e, the width W3 of the varied width rib 271 is uniform with respect to the axial direction A.

Figures 8A, 8B, 8C:
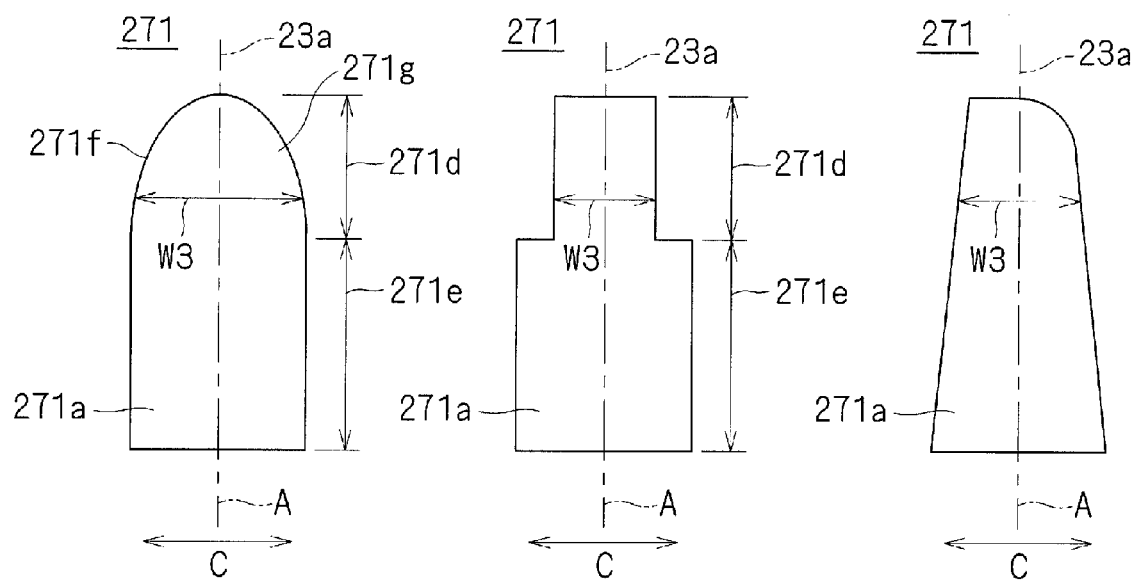
FIGS. 8A, 8B, and 8C are diagrams illustrating variations of the varied width rib as illustrated in FIG. 7A.

Here, referring to FIG. 7A, both side surfaces 271f and 271g, in the circumferential direction C, of the varied width rib 271 in the decreased width section 271d may assume a tapered shape such that the width W3 decreases substantially linearly toward the axially opening portion side. Alternatively, referring to FIG. 8A, the side surfaces 271f and 271g may assume a curved shape such that the width W3 decreases at an increasing rate toward the axially opening portion side. Referring to FIG. 8B, in another variation of the present preferred embodiment, the width W3 of the varied width rib 271 in the decreased width section 271d may be uniform with respect to the axial direction A (but is smaller than the width W3 in the uniform width section 271e). Referring to FIG. 8C, in still another variation of the present preferred embodiment, the width W3 may gradually decrease toward the axially opening portion side over the entire axial length of the varied width rib 271. Referring to FIG. 8C, note that both side surfaces, in the circumferential direction, of the varied width rib 271 may be laterally asymmetrical when viewed radially from the inside.

As described above, the width W3 of the varied width rib 271 is smaller in the decreased width section 271d than in the uniform width section 271e. Accordingly, the amount of the pressing force applied by a contact surface 271a of the varied width rib 271 is smaller for that portion of the sleeve 6 which makes contact with the decreased width section 271d of the varied width rib 271 than for that portion of the sleeve 6 which makes contact with the uniform width section 271e. In particular, according to the structures as illustrated in FIGS. 7A and 8A, the width W3 of the varied width rib 271 in the decreased width section 271d gradually decreases toward the axially opening portion side; therefore, the amount of the pressing force applied by the varied width rib 271 becomes progressively smaller toward the axially opening portion side, for that portion of the sleeve 6 which makes contact with the decreased width section 271d of the varied width rib 271. As to the uniform width rib 272, the width W4 is substantially uniform over its entire axial length, and accordingly, the amount of the pressing force applied by the uniform width rib 272 onto the sleeve 6 is substantially uniform with respect to the axial direction A.

In the present preferred embodiment also, the center of gravity Bc of the rotating body 10 is, with respect to the axial direction A, located in that portion of the sleeve 6 which is located toward the axially opening portion side. In addition, the center of gravity Bc of the rotating body 10 is either located at substantially the same axial position as the ends 271b and 272b of the varied and uniform width ribs 271 and 272 on the axially opening portion side, or located more on the axially cavity portion side than the ends 271b and 272b. In particular, according to the structures as illustrated in FIGS. 7A, 8A, and 8B, the decreased width section 271d of the varied width rib 271 substantially corresponds to that portion of the outer surface 6a of the sleeve 6 where the center of gravity Bc of the rotating body 10 is located.

In addition, in the present preferred embodiment, it is possible to allow the decreased width section 271d of the varied width rib 271 to correspond to an end portion of the outer surface 6a of the sleeve 6 on the axially opening portion side where the upper small diameter portion 6f is provided on the inner surface 6d of the sleeve 6.

Therefore, the addition of the varied width rib 271 as described above allows an appropriate reduction in the radially inward pressing force applied onto that portion of the sleeve 6 which is located toward the axially opening portion side and where the center of gravity Bc of the rotating body 10 and the upper small diameter portion 6f of the sleeve 6 are located, and facilitates the optimization of the amount of the pressing force applied by the ribs 271 and 272 so as to reduce the deformation of the sleeve 6 (e.g., to prevent an excessive reduction in the inside diameter of the sleeve 6). That is, the total number of varied and uniform width ribs 271 and 272 can be set at a number that allows an effective reduction in the deformation of the sleeve 6 caused by circumferential variations in the pressing force applied by the ribs 271 and 272. In addition, it is possible to partially reduce the pressing force applied by the ribs 271 and 272 onto that portion of the sleeve 6 which is located toward the axially opening portion side and which is concerned with problems such as the problem of the excessive reduction in the inside diameter of the sleeve 6 caused by the pressing force applied by the ribs 271 and 272.

In this connection, according to the structures as illustrated in FIGS. 7A, 8A, and 8B, the decreased width section 271d of the varied width rib 271 is arranged to substantially correspond to the outer surface 6a of that portion of the sleeve 6 where the center of gravity Bc of the rotating body 10 and the upper small diameter portion 6f of the sleeve 6 are located. This allows more effective control of the pressing force applied to that portion of the sleeve 6. Meanwhile, the uniform width section 271e of the varied width rib 271 applies the pressing force substantially uniformly over the axial length of that portion of the sleeve 6 which makes contact with the uniform width section 271e of the varied width rib 271, to achieve the stable support of the sleeve 6.

Moreover, the combined use of the varied and uniform width ribs 271 and 272 produces a beneficial effect as described below. The uniform width rib 272, whose width W3 is uniform with respect to the axial direction A, applies the pressing force to the sleeve 6 substantially uniformly with respect to the axial direction A. Therefore, the uniform width rib 272 supports each axial position of the sleeve 6 stably. At the same time, the additional use of the varied width rib 271 allows the optimization of the amount of the pressing force applied by the varied and uniform width ribs 271 and 272 to each axial position of the sleeve 6.

Furthermore, the varied and uniform width ribs 271 and 272 are arranged alternately in the circumferential direction. This contributes to preventing the addition of the varied width ribs 271 from causing uneven circumferential distribution of the pressing force applied by the varied and uniform width ribs 271 and 272 onto the sleeve 6 (this is especially true for that portion of the sleeve 6 which is located toward the axially opening portion side). This contributes to achieving the stable support of the sleeve 6, while reducing the deformation of the sleeve 6 caused by the circumferential variations in the pressing force applied by the ribs 271 and 272 onto the sleeve 6.

Furthermore, the varied and uniform width ribs 271 and 272 are preferably arranged to be substantially axially symmetrical with respect to the shaft center 23a. This allows the pressing force applied by the varied and uniform width ribs 271 and 272 onto the sleeve 6 to be substantially axially symmetrical with respect to the shaft center 23a. This allows the sleeve 6 to be stably supported by the varied and uniform width ribs 271 and 272, and contributes to reducing the circumferential variations in the pressing force applied by the ribs 271 and 272 onto the sleeve 6, to reduce the deformation of the sleeve 6.

In the foregoing description of the preferred embodiments, it has been assumed that the bearing structures according to the preferred embodiments are applied to the fan apparatus 1. Note, however, that the bearing structures according to the preferred embodiments are applicable not only to the fan apparatus 1 but also to various other devices having a bearing structure. Examples of other applications include, for example, disc drive apparatuses designed to rotate a disc-shaped recording medium and any other devices that include electric motors.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A bearing structure comprising:
    a rotating body including a rotating shaft;
    a sleeve having the rotating shaft inserted therein such that the rotating shaft is rotatable with respect to the sleeve;
    a sleeve support portion having a bottom, being substantially tubular, extending in an axial direction, and arranged to support the sleeve; and
    a base portion connected to an axial end of the sleeve support portion; wherein
    the sleeve support portion includes:
        an opening portion arranged to receive the rotating shaft;
        a cavity portion arranged to contain the sleeve; and
        a plurality of ribs provided on an inner surface of the cavity portion and extending in the axial direction, the ribs being spaced from each other in a circumferential direction centered on the rotating shaft; wherein
    each of the ribs includes an axial contact surface arranged to contact at least a portion of a radially outer surface of the sleeve;
    the ribs include a plurality of different types of ribs, each of the plurality of different types of ribs having differently positioned ones of the axial contact surfaces on an axially opening portion side thereof; and
    at least one of the ribs is arranged such that an axially upper portion of its axial contact surface is positioned axially above a center of gravity of the rotating body and at least another one of the ribs is arranged such that its axial contact surface is positioned axially below the center of gravity of the rotating body.

2. The bearing structure according to claim 1, wherein the plurality of different types of ribs include at least one greater-length rib and at least one shorter-length rib; and
    the axial contact surface of the greater-length rib is closer to the opening portion than the axial contact surface of the shorter-length rib is to the opening portion.

3. The bearing structure according to claim 2, wherein the at least one greater-length rib and the at least one shorter-length rib have a substantially equal width in a circumferential direction.

4. The bearing structure according to claim 2, wherein the at least one greater-length rib and the at least one shorter-length rib have a different width in a circumferential direction.

5. The bearing structure according to claim 2, wherein the at least one greater-length rib and the at least one shorter-length rib are arranged such that a radial distance from a shaft center of the rotating shaft to the axial contact surfaces of the at least one greater-length rib and the at least one shorter-length rib is substantially the same.

6. The bearing structure according to claim 2, wherein the at least one greater-length rib and the at least one shorter-length rib are arranged such that a radial distance from a shaft center of the rotating shaft to the axial contact surfaces of the at least one greater-length rib and the at least one shorter-length rib is different.

7. The bearing structure according to claim 1, wherein an axial position of the center of gravity of the rotating body including the rotating shaft either substantially coincides with, or is located more on an axially cavity portion side than, the axially opening portion side of an axial end of one of the plurality of ribs.

8. The bearing structure according to claim 1, wherein the sleeve includes two axial ends, and both of the axial ends of the sleeve are positioned within the cavity portion of the sleeve support portion.

9. A motor comprising:
    the bearing structure of claim 1;
    a rotating motor component defined by the rotating body and arranged to rotate on the rotating shaft together with the rotating shaft; and
    a stationary motor component arranged to be fixed at a given position; wherein
    the rotating and stationary motor components are arranged to cause the rotating motor component to rotate together with the rotating shaft because of torque produced therebetween due to electromagnetic interaction.

10. A fan apparatus comprising:
    the motor of claim 9; and
    an impeller arranged to rotate together with the rotating shaft.

* * * * *